(12) United States Patent
Amano et al.

(10) Patent No.: US 8,213,095 B2
(45) Date of Patent: Jul. 3, 2012

(54) PROJECTION LENS AND PROJECTION DISPLAY DEVICE USING THE SAME

(75) Inventors: Masaru Amano, Saitama (JP); Kimiaki Nakazawa, Saitama (JP)

(73) Assignee: Fujifilm Corporation, Tokyo (JP)

( * ) Notice: Subject to any disclaimer, the term of this patent is extended or adjusted under 35 U.S.C. 154(b) by 399 days.

(21) Appl. No.: 12/508,861

(22) Filed: Jul. 24, 2009

(65) Prior Publication Data

US 2010/0053570 A1 Mar. 4, 2010

(30) Foreign Application Priority Data

Aug. 27, 2008 (JP) ................................ P2008-218202

(51) Int. Cl.
*G02B 13/02* (2006.01)
*G02B 15/14* (2006.01)
(52) U.S. Cl. .................... 359/748; 359/745; 359/684
(58) Field of Classification Search .................. 353/101; 359/781, 782, 783, 680, 681, 682, 683, 684, 359/689, 745, 746, 747, 748
See application file for complete search history.

(56) References Cited

U.S. PATENT DOCUMENTS

| 5,490,014 A * | 2/1996 | Suzuki ......................... 359/745 |
| 6,317,269 B1 | 11/2001 | Yamamoto |
| 2004/0001186 A1 * | 1/2004 | Yamamoto ..................... 353/31 |
| 2007/0263295 A1 * | 11/2007 | Enomoto ..................... 359/684 |

FOREIGN PATENT DOCUMENTS

JP 2001-166205 A 6/2001

* cited by examiner

*Primary Examiner* — Francis M Legasse, Jr.
*Assistant Examiner* — Bao-Luan Le
(74) *Attorney, Agent, or Firm* — Birch, Stewart, Kolasch & Birch, LLP

(57) ABSTRACT

Disclosed are a projection lens that has a small size, a simple inner focus structure, a high optical performance, and a wide angle of view of about 75 degrees or more, and a projection display device.

A projection lens includes a first lens group having a negative refractive power, a second lens group having a positive refractive power, and a third lens group having a positive refractive power arranged in this order from a magnification side. A fifth lens arranged closest to a reduction side in the first lens group is moved along an optical axis to adjust focus. The projection lens satisfies the following conditional expression:

$$3.0 < D_{G12}/f < 6.0$$

where $D_{G12}$ indicates a distance between the first lens group and the second lens group and f indicates the focal length of the entire lens system.

7 Claims, 5 Drawing Sheets

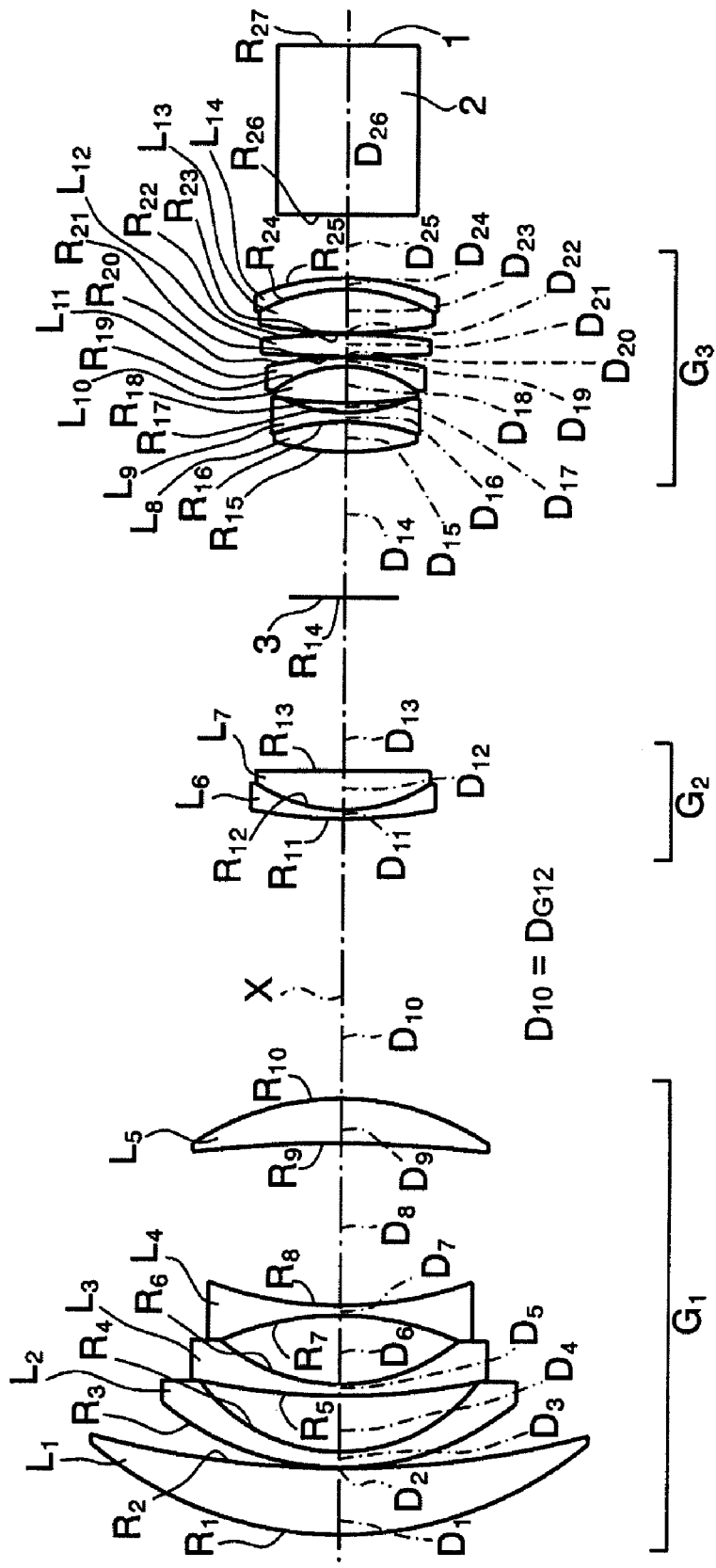
FIG.1 EXAMPLE 1

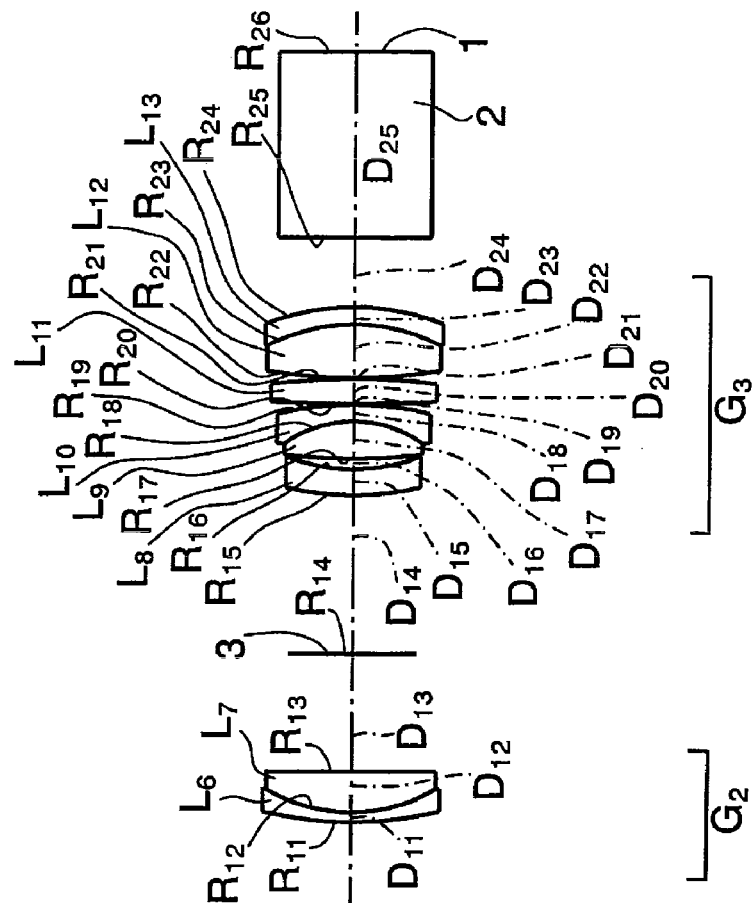
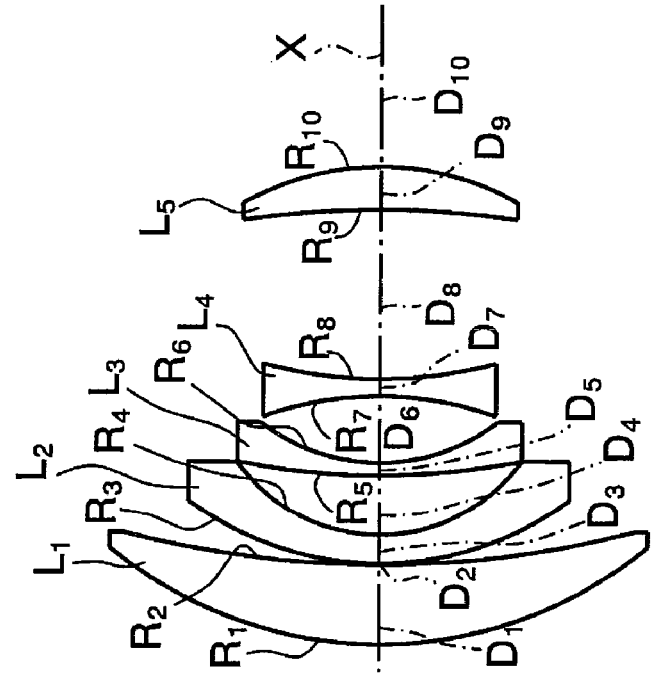

FIG.3
EXAMPLE 3
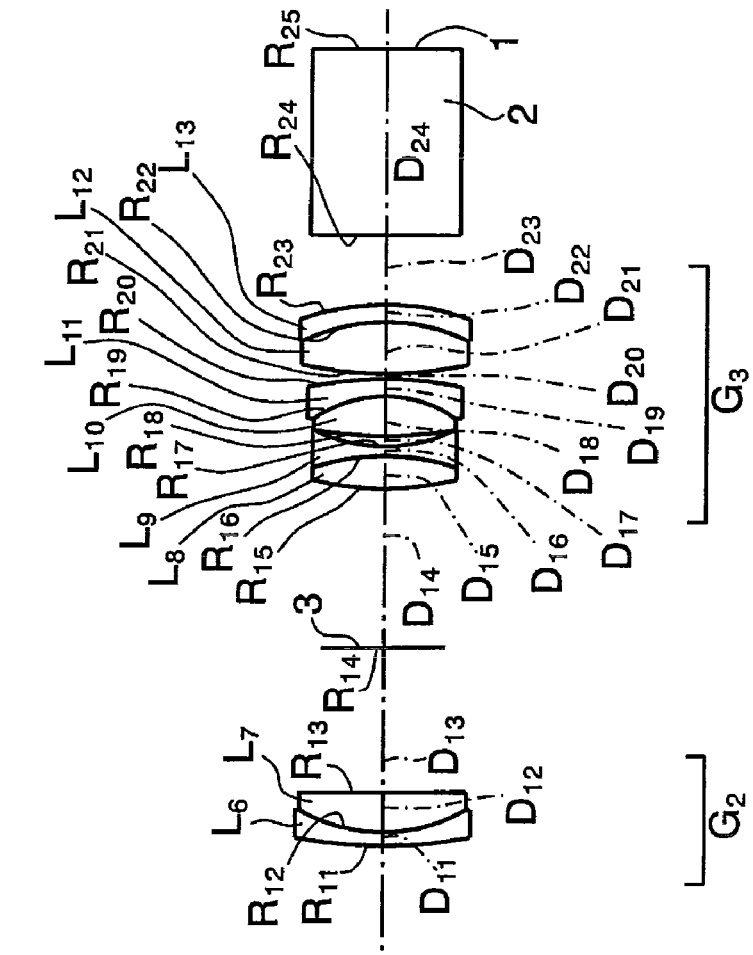
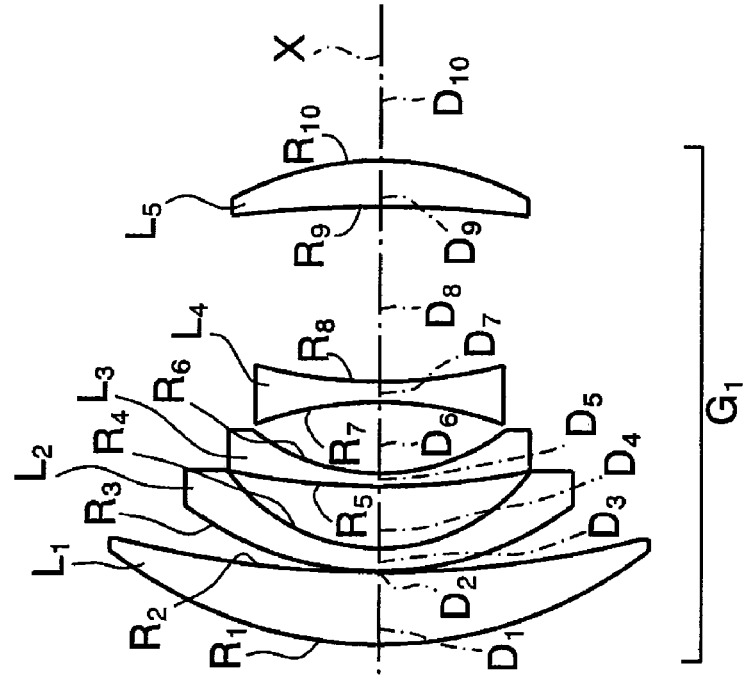

EXAMPLE 1

EXAMPLE 2

EXAMPLE 3

PROJECTION LENS AND PROJECTION DISPLAY DEVICE USING THE SAME

CROSS-REFERENCE TO RELATED APPLICATIONS

This application is based upon and claims the benefit of priority from Japanese Patent Application No. 2008-218202 filed on Aug. 27, 2008; the entire contents of which are incorporated herein by reference.

BACKGROUND OF THE INVENTION

1. Field of the Invention

The present invention relates to a projection lens that enlarges and projects, for example, display information from a light valve, such as a transmissive or reflective liquid crystal display device or a DMD (digital micro-mirror device), and more particularly, to a projection lens applicable for a so-called front projection display device, and a projection display device using the same.

2. Description of the Related Art

In recent years, projection display devices using light valves, such as a liquid crystal display device or a DMD display device, have come into widespread use. In particular, a projection display device has been widely used which uses three light valves corresponding to illumination light components of three primary colors, such as R, G, and B, to modulate the illumination light components, combines the light components modulated by the three light valves using, for example, a prism, and displays an image on a screen using a projection lens.

In the projection display device that uses a color composition optical system to compose the modulated light components from the three light valves and projects the composed light, the projection lens needs to have a large back focal length in order to arrange a prism for color composition as a characteristic of the projection lens. In addition, the spectral characteristics of the color composition optical system vary depending on the angle of incident light. Therefore, the projection lens needs to have characteristics that an entrance pupil is positioned at a sufficiently long distance as viewed from the reduction side. That is, the projection lens needs to have telecentricity. The projection lens also needs to correct aberration according to the resolution of a device.

As the size of the light valve is reduced, the precision thereof is improved, and personal computers are widely spread, the use of the projection display device for presentation is increased. Therefore, there is an increasing demand for a projection display device having a high performance, high brightness, and a small size.

However, as the performance and brightness of the projection lens are increased, the size of the lens is increased, and the size of a moving mechanism for moving a lens group to adjust focus is also increased.

An inner focus type in which only some lenses in a lens group can be moved to easily adjust focus has been known in the field of an imaging lens of a single-lens reflex camera or video camera. However, when this inner focus type is applied to a projection lens without any change, an emission angle is small, and it is difficult to ensure telecentricity.

Therefore, in the projection display device using the inner focus lens, when a color composition prism is used to perform color composition, color unevenness occurs on a screen. Therefore, it is difficult to use the inner focus lens according to the related art as a projection lens of a projector, without changing the structure of the inner focus lens.

Therefore, in order to solve the above-mentioned problems, JP-A-2001-166205 discloses a projection lens and a projector apparatus.

That is, the projection lens disclosed in JP-A-2001-166205 includes a first negative lens group, a second positive lens group, and a third positive lens group arranged in this order from a magnification side, and a lens arranged closest to a reduction side in the first lens group is moved along the optical axis X to adjust focus. In addition, the gap between the first lens group and the second lens group, and the focal length of the entire lens system are set in a predetermined range.

The projection lens having the above-mentioned structure has an appropriate back focal length, telecentricity, a high optical performance capable of reducing distortion and chromatic aberration, a simple inner focus structure, and a small size.

However, in the related art disclosed in JP-A-2001-166205, a total angle of view is about 69 degrees. In recent years, a wide-angle projection lens having a high optical performance and a total angle of view of about 75 degrees or more has been required in order to meet a demand for a projection display device that can be used in a small space in which a distance to the screen is small. However, it is difficult for the related art disclosed in JP-A-2001-166205 to meet the demand.

SUMMARY OF THE INVENTION

The invention has been made in order to solve the above-mentioned problems, and an object of the invention is to provide a projection lens having a simple inner focus structure, an appropriate back focal length, telecentricity, a high optical performance, a wide angle of view of about 75 degrees or more, and a small size, and a projection display device using the same.

According to an aspect of the invention, a projection lens includes: a first lens group having a negative refractive power; a second lens group having a positive refractive power; and a third lens group having a positive refractive power. The first to third lens groups are arranged in this order from a magnification side. A lens unit arranged closest to a reduction side in the first lens group is moved along an optical axis to adjust focus. The projection lens satisfies Conditional expression 1 given blow:

$$3.0 < D_{G12}/f < 6.0 \quad \text{[Conditional expression 1]}$$

(where $D_{G12}$ indicates a distance between the first lens group and the second lens group and f indicates the focal length of the entire lens system).

Here, examples of the term 'lens unit' include a single lens and a cemented lens.

The projection lens may satisfy Conditional expression 2 given below:

$$-8.0 < f_1/f < -3.0 \quad \text{[Conditional expression 2]}$$

(where $f_1$ indicates the focal length of the first lens group).

The projection lens may satisfy Conditional expression 3 given below:

$$2.5 < f_{23}/f < 6.0 \quad \text{[Conditional expression 3]}$$

(where $f_{23}$ indicates a composite focal length of the second lens group and the third lens group).

In the projection lens according to the above-mentioned aspect, the lens unit arranged closest to the reduction side in the first lens group may be a single positive lens having a convex surface facing the reduction side.

The projection lens may satisfy Conditional expression 4 given below:

$$1.8 < n_{1G} \quad \text{[Conditional expression 4]}$$

(where $n_{1G}$ indicates the average value of the refractive indexes of lenses in the first lens group with respect to the d-line, except for the lens unit arranged closest to the reduction side in the first lens group).

In the projection lens according to the above-mentioned aspect, a lens arranged closest to the reduction side in the third lens group may be a cemented lens of a positive lens and a negative lens.

According to another aspect of the invention, a projection display device includes: at least one light source; at least one light valve; at least one illumination optical unit that guides light emitted from the light source to the light valve; and the projection lens according to the above-mentioned aspect. The light valve modulates the light emitted from the light source, and the modulated light is projected onto a screen by the projection lens.

According to the projection lens and the projection display device of the above-mentioned aspects of the invention, a lens arranged closest to the reduction side in the first lens group is moved along the optical axis X to adjust focus. When the gap between the first lens group and the second lens group is $D_{G12}$ and the focal length of the entire lens system is f, the projection lens satisfies Conditional expression 1: $3.0<D_{G12}/f<6.0$.

In this way, it is possible to obtain such a large back focal length that a color composition optical system can be inserted, and ensure telecentricity. Therefore, it is possible to reduce distortion and chromatic aberration and obtain a high optical performance.

When Conditional expression 1 is satisfied, it is possible to obtain a projection lens having a high optical performance and a wide total angle of view of about 75 degrees or more, as compared to the related art disclosed in JP-A-2001-166205. In addition, it is possible to reduce the size of the entire lens system.

The projection display device according to the above-mentioned aspect of the invention uses the projection lens according to the above-mentioned aspect. Therefore, the projection display device can have a wide total angle of view of 75 degrees or more and a high optical performance. In addition, it is possible to reduce the size of the entire lens system.

BRIEF DESCRIPTION OF THE DRAWINGS

FIG. 1 is a diagram illustrating the structure of a projection lens according to Example 1 of the invention;

FIG. 2 is a diagram illustrating the structure of a projection lens according to Example 2 of the invention;

FIG. 3 is a diagram illustrating the structure of a projection lens according to Example 3 of the invention;

DESCRIPTION OF THE PREFERRED EMBODIMENTS

Figure 4:
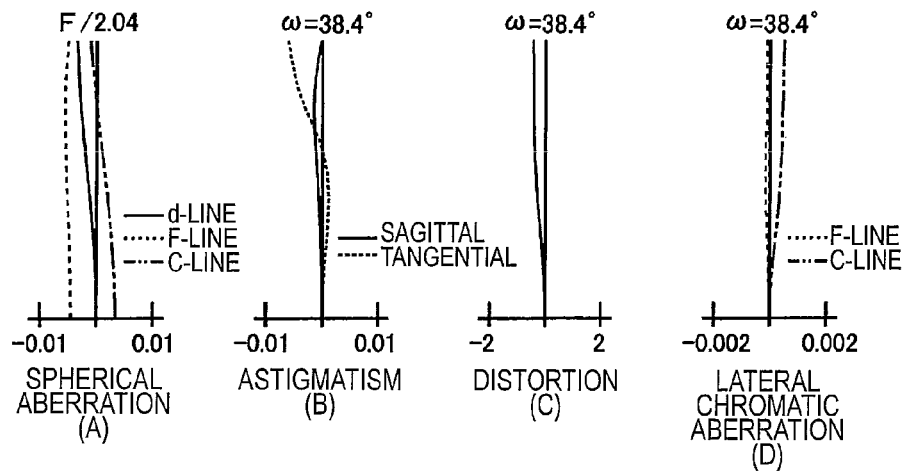
FIG. 4 is a diagram illustrating all aberrations of the projection lens according to Example 1, where (A) shows spherical aberration, (B) shows astigmatism, (C) shows distortion, and (D) shows lateral chromatic aberration.

Hereinafter, exemplary embodiments of the invention will be described with reference to the accompanying drawings. FIG. 1 is a diagram illustrating a projection lens according to an embodiment of the invention, and shows the structure of a lens according to Example 1, which will be described below.

This lens will be described below as a representative example of this embodiment. In FIG. 1, X indicates an optical axis.

The projection lens according to this embodiment is a fixed-focus lens, and includes a first lens group $G_1$ having a negative refractive power, a second lens group $G_2$ having a positive refractive power, and a third lens group $G_3$ having a positive refractive power arranged in this order from a magnification side. In addition, the reduction side of the projection lens is substantially telecentric.

The first lens group $G_1$ includes five lenses, that is, positive, negative, negative, negative, and positive lenses arranged in this order from the magnification side. In addition, the second lens group $G_2$ includes two negative and positive lenses. The third lens group $G_3$ includes seven lenses, that is, positive, negative, positive, negative, positive, positive, and negative lenses arranged in this order from the magnification side (in Example 2, six lenses, that is, negative, positive, negative, positive, positive, and negative arranged in this order from the magnification side, and in Example 3, six lenses, that is, positive, negative, positive, negative, positive, and negative lenses arranged in this order from the magnification side).

An aperture diaphragm 3 is provided between the second lens group $G_2$ and the third lens group $G_3$ (a mask may also be provided at a different position).

In the projection lens shown in FIG. 1, a light beam that is incident from the right side of FIG. 1 and is given image information from an image display surface 1 of a light valve is incident on the projection lens through a glass block (which includes various filters, such as a low pass filter or an infrared cut filter) 2, and is enlarged and projected to the left side of FIG. 1 by the projection lens. FIG. 1 shows only one image display surface 1 for easy viewing. However, in a projection display device, a color separation optical system separates a light beam emitted from a light source into three primary color light beams, and light valves are provided for the three primary color light beams to display a full color image.

Specifically, a color composition unit (glass block), such as a cross dichroic prism, may be provided at the position of the glass block 2 to compose the three primary color light beams.

It is preferable to move a lens unit (a fifth lens $L_5$ in FIG. 1) arranged closest to the reduction side in the first lens group $G_1$ in the optical axis direction to adjust focus.

When the lens unit arranged closest to the reduction side in the first lens group $G_1$ is used as a focus group to adjust focus, it is possible to make the total length of the lens system constant.

The projection lens according to this embodiment satisfies Conditional expressions 1 to 4 given below:

$$3.0<D_{G12}/f<6.0, \quad \text{[Conditional expression 1]}$$

$$-8.0<f_1/f<-3.0, \quad \text{[Conditional expression 2]}$$

$$2.5<f_{23}/f<6.0, \text{ and} \quad \text{[Conditional expression 3]}$$

$$1.8<n_{1G} \quad \text{[Conditional expression 4]}$$

(where $D_{G12}$ indicates the distance between the first lens group $G_1$ and the second lens group $G_2$, f indicates the focal length of the entire lens system, $f_1$ indicates the focal length of the first lens group $G_1$, $f_{23}$ indicates a composite focal length of the second lens group $G_2$ and the third lens group $G_3$, and $n_{1G}$ indicates the average value of the refractive indexes of lenses in the first lens group $G_1$ with respect to the d-line, except for the lens unit arranged closest to the reduction side in the first lens group $G_1$).

According to the above-mentioned structure, the projection lens according to this embodiment can have an appropriate back focal length, a wide angle of view, a high optical performance, and a small size.

Hereinafter, the meaning of Conditional expressions 1 to 4 will be described.

First, if the ratio is greater than the upper limit of Conditional expression 1, it is difficult to reduce the size of the entire lens system. On the other hand, if the ratio is less than the lower limit of Conditional expression 1, it is difficult to ensure a total angle of view of about 75 degrees or more. Therefore, it is difficult to respond to a demand for increasing an angle of view.

Conditional expression 1 and the Conditional expression 2 are set so as to be established at all focus positions.

In addition, the projection lens may be configured so as to satisfy the following Conditional expression 1' instead of Conditional expression 1:

$$3.5 < D_{G12}/f < 5.5.$$  [Conditional expression 1']

In this case, it is possible to further increase an angle of view while reducing the size of the entire lens system.

If the values of $f_1/f$ and $f_{23}/f$ are greater than the upper limits of Conditional expressions 2 and 3 or less than the lower limits thereof, the power balance between the first lens group $G_1$ and the second and third lens groups $G_2$ and $G_3$ is broken, and it is difficult to obtain an appropriate back focal length or correct all aberrations. Therefore, the projection lens is configured so as to satisfy Conditional expressions 2 and 3. In this case, the power balance between the first lens group $G_1$ and the second and third lens groups $G_2$ and $G_3$ is maintained, and an appropriate back focal length is obtained. As a result, it is easy to correct all aberrations.

If the average value is less than the lower limit of Conditional expression 4, it is difficult to increase an angle of view. Therefore, in this embodiment, the projection lens is configured so as to satisfy Conditional expression 4. In this case, it is possible to obtain a total angle of view of about 75 degrees or more.

The projection lens disclosed in JP-A-2001-166205 has a small total angle of view of about 69 degrees or less. However, as described above, the projection lens according to this embodiment is configured such that the value of $D_{G12}/f$ is in the range of 3.0 to 6.0. Therefore, it is possible to ensure a total angle of view of about 75 degrees or more.

Figure 7:
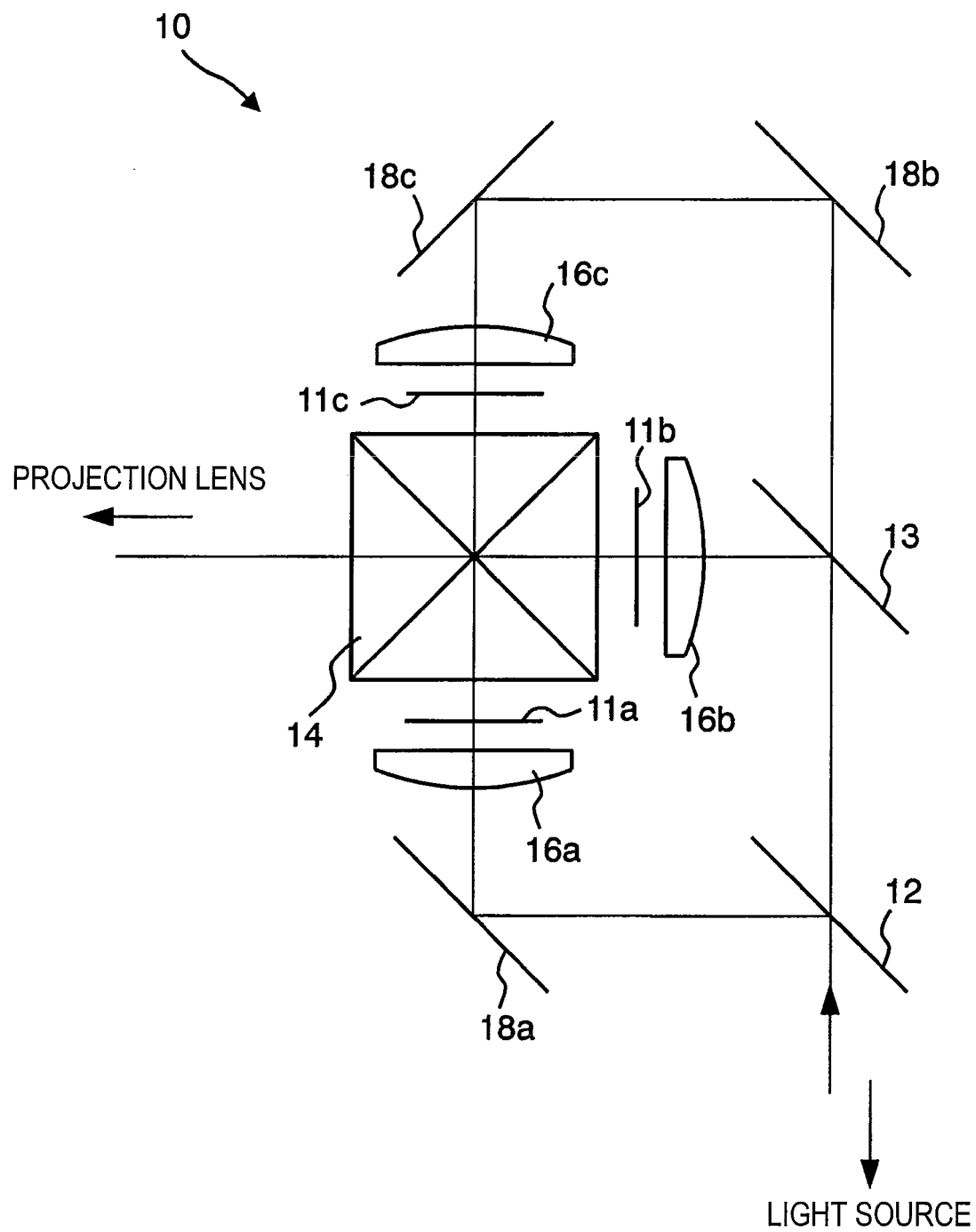
FIG. 7 is a diagram schematically illustrating the structure of a main part of a projection display device according to an embodiment of the invention.

Next, a projection display device according to an embodiment of the invention will be described. FIG. 7 is a diagram illustrating an example of the structure of a main part (illumination optical system 10) of the projection display device according to the embodiment of the invention.

As shown in FIG. 7, the illumination optical system 10 includes transmissive liquid crystal panels 11a to 11c, serving as light valves, dichroic mirrors 12 and 13 for color separation, a cross dichroic prism 14 for color composition, condenser lenses 16a to 16c, and total reflecting mirrors 18a to 18c. The previous stage of the dichroic mirror 12 is not shown in FIG. 7. White light emitted from the light source is incident on the liquid crystal panels 11a to 11c corresponding to three color light beams (G light, B light, and R light) through the illumination optical unit and then modulated. Then, the modulated light beams are projected onto a screen by the projection lens.

Since the projection display device uses the projection lens according the embodiment of the invention, it is possible to effectively correct chromatic aberration and obtain a large high-resolution screen.

Next, detailed examples of the projection lens according to the embodiment of the invention will be described. In the following examples, members having the same operation and effect are denoted by the same reference numerals.

Example 1

As shown in FIG. 1, a projection lens according to Example 1 includes a first lens group $G_1$ having a negative refractive power, a second lens group $G_2$ having a positive refractive power, and a third lens group $G_3$ having a positive refractive power arranged in this order from the magnification side, and the reduction side of the projection lens is substantially telecentric. The first lens group $G_1$ includes five lenses, that is, a first lens $L_1$, which is a positive meniscus lens having a convex surface facing the magnification side, second and third lenses $L_2$ and $L_3$, which are negative meniscus lenses each having a convex surface facing the magnification side, a fourth lens $L_4$, which is a biconcave lens, and a fifth lens $L_5$, which is a positive meniscus lens having a convex surface facing the reduction side, arranged in this order from the magnification side.

The second lens group $G_2$ includes a cemented lens of a sixth lens $L_6$, which is a negative meniscus lens having a convex surface facing the magnification side, and a seventh lens $L_7$, which is a plano-convex lens having a convex surface facing the magnification side.

The third lens group $G_3$ includes seven lenses, that is, a cemented lens of an eighth lens $L_8$, which is a biconvex lens, and a ninth lens $L_9$, which is a biconcave lens, a cemented lens of a tenth lens $L_{10}$, which is a biconvex lens, and an eleventh lens $L_{11}$, which is a negative meniscus lens having a convex surface facing the reduction side, a twelfth lens $L_{12}$, which is a biconvex lens, and a cemented lens of a thirteenth lens $L_{13}$, which is a biconvex lens, and a fourteenth lens $L_{14}$, which is a negative meniscus lens having a convex surface facing the reduction side.

An aperture diaphragm (or a mask, which is the same with the following examples) 3 is provided between the second lens group $G_2$ and the third lens group $G_3$.

The fifth lens $L_5$ arranged closest to the reduction side in the first lens group $G_1$ is moved in the optical axis direction to adjust focus. The fifth lens $L_5$ is a single positive spherical lens having a convex surface facing the reduction side, and has a certain degree of power. In this way, it is possible to reduce the weight and the movement distance of a focus group. As a result, it is possible to more effectively use the first lens group as a focus group.

The projection lens according to Example 1 is configured so as to satisfy Conditional expressions 1 to 4 (and Conditional expression 1').

FIG. 1 also shows the image display surface 1 of the light valve, the glass block 2, and the aperture diaphragm 3.

In Table 1, an upper part shows the curvature radius R of each lens surface in the projection lens according to Example 1 (the focal length of the entire lens system is normalized to 1.00, which is similarly applied to the following examples), the thickness of the center of each lens and an air space (hereinafter, referred to as an on-axis surface spacing) D between the lenses (the focal length of the entire lens system is normalized to 1.00, which is similarly applied to the following examples), and the refractive index $N_d$ and the Abbe number $v_d$ of each lens with respect to the d-line. In Table 1 and Tables 2 to 4, which will be described below, a surface number is sequentially increased from the magnification side.

In Table 1, a lower part shows a variable spacing 1 (the gap between the fourth lens $L_4$ and the fifth lens $L_5$) and a variable spacing 2 (the gap between the fifth lens $L_5$ and the sixth lens $L_6$) when a magnification side power is 126.1 and 430.3. The term 'magnification side power' does not mean power that varies when a projection distance is constant, but means power that varies depending on the projection distance in the focusing range.

TABLE 1

| Surface number | R | D | Nd | vd |
|---|---|---|---|---|
| 1 | 5.503 | 0.959 | 1.8348 | 42.7 |
| 2 | 13.565 | 0.015 | | |
| 3 | 3.955 | 0.224 | 1.8348 | 42.7 |
| 4 | 2.499 | 0.803 | | |
| 5 | 9.775 | 0.167 | 1.8348 | 42.7 |
| 6 | 2.663 | 0.983 | | |
| 7 | −4.230 | 0.140 | 1.8466 | 23.9 |
| 8 | 5.453 | Variable spacing 1 | | |
| 9 | −18.366 | 0.646 | 1.7550 | 52.3 |
| 10 | −3.770 | Variable spacing 2 | | |
| 11 | 6.920 | 0.129 | 1.8040 | 46.6 |
| 12 | 2.268 | 0.561 | 1.6727 | 32.1 |
| 13 | ∞ | 2.499 | | |
| 14 (Mask) | ∞ | 2.091 | | |
| 15 | 3.741 | 0.436 | 1.8340 | 37.2 |
| 16 | −3.149 | 0.129 | 1.6889 | 31.1 |
| 17 | 2.183 | 0.146 | | |
| 18 | 6.815 | 0.525 | 1.4875 | 70.4 |
| 19 | −1.673 | 0.129 | 1.8340 | 37.2 |
| 20 | −4.870 | 0.015 | | |
| 21 | 18.887 | 0.322 | 1.6204 | 60.3 |
| 22 | −9.193 | 0.015 | | |
| 23 | 7.067 | 0.627 | 1.6180 | 63.3 |
| 24 | −2.588 | 0.167 | 1.8466 | 23.9 |
| 25 | −3.437 | 0.908 | | |
| 26 | ∞ | 2.430 | 1.5163 | 64.0 |
| 27 | ∞ | | | |

| | Magnification side power | |
|---|---|---|
| | 126.1 times | 430.3 times |
| Variable spacing 1 | 2.322 | 2.305 |
| Variable spacing 2 | 4.001 | 4.018 |

Values corresponding to Conditional expressions 1 to 4 (and Conditional expression 1') in Example 1 are shown in Table 4, which will be described below. As can be seen from Table 4, Example 1 satisfies all of Conditional expressions 1 to 4 (and Conditional expression 1').

Example 2

FIG. 2 shows the structure of a projection lens according to Example 2. The projection lens according to Example 2 is similar to that according to Example 1 in that it includes a first lens group $G_1$ having a negative refractive power, a second lens group $G_2$ having a positive refractive power, and a third lens group $G_3$ having a positive refractive power arranged in this order from the magnification side and the reduction side thereof is substantially telecentric, but is different therefrom in the structure of the third lens group $G_3$.

That is, the third lens group $G_3$ includes six lenses, that is, an eighth lens $L_8$, which is a negative meniscus lens having a convex surface facing the magnification side, a cemented lens of a ninth lens $L_9$, which is a biconvex lens, and a tenth lens $L_{10}$, which is a negative meniscus lens having a convex surface facing the reduction side, an eleventh lens $L_{11}$, which is a biconvex lens, and a cemented lens of a twelfth lens $L_{12}$, which is a biconvex lens, and a thirteenth lens $L_{13}$, which is a negative meniscus lens having a convex surface facing the reduction side, arranged in this order from the magnification side. In addition, the projection lens according to Example 2 is similar to that according to Example 1 in the lens structure of the first lens group $G_1$ and the second lens group $G_2$ and in that the fifth lens $L_5$ is moved in the optical axis direction to adjust focus.

In Table 2, an upper part shows the curvature radius R of each lens surface in the projection lens according to Example 2, the on-axis surface spacing D between the lenses, and the refractive index $N_d$ and the Abbe number $v_d$ of each lens with respect to the d-line. In Table 2, a lower part shows the variable spacing 1 (the gap between the fourth lens $L_4$ and the fifth lens $L_5$) and the variable spacing 2 (the gap between the fifth lens $L_5$ and the sixth lens $L_6$) when a magnification side power is 126.1 and 430.3.

TABLE 2

| Surface number | R | D | Nd | vd |
|---|---|---|---|---|
| 1 | 5.495 | 1.056 | 1.8348 | 42.7 |
| 2 | 13.308 | 0.015 | | |
| 3 | 4.185 | 0.380 | 1.8348 | 42.7 |
| 4 | 2.312 | 0.778 | | |
| 5 | 9.601 | 0.167 | 1.8348 | 42.7 |
| 6 | 2.597 | 0.866 | | |
| 7 | −4.569 | 0.221 | 1.8466 | 23.9 |
| 8 | 5.822 | Variable spacing 1 | | |
| 9 | −12.574 | 0.568 | 1.6968 | 55.5 |
| 10 | −3.674 | Variable spacing 2 | | |
| 11 | 4.967 | 0.129 | 1.8010 | 35.0 |
| 12 | 2.221 | 0.537 | 1.6990 | 30.1 |
| 13 | ∞ | 1.554 | | |
| 14 (Mask) | ∞ | 2.091 | | |
| 15 | 4.048 | 0.336 | 1.8052 | 25.4 |
| 16 | 2.421 | 0.141 | | |
| 17 | 8.363 | 0.490 | 1.5182 | 58.9 |
| 18 | −1.600 | 0.216 | 1.8052 | 25.4 |
| 19 | −4.471 | 0.015 | | |
| 20 | 24.414 | 0.322 | 1.6584 | 50.9 |
| 21 | −9.455 | 0.018 | | |
| 22 | 7.155 | 0.705 | 1.6180 | 63.3 |
| 23 | −2.523 | 0.228 | 1.8466 | 23.9 |
| 24 | −3.249 | 0.152 | | |
| 25 | ∞ | 3.184 | 1.5163 | 64.0 |
| 26 | ∞ | | | |

| | Magnification side power | |
|---|---|---|
| | 126.1 times | 430.3 times |
| Variable spacing 1 | 2.222 | 2.205 |
| Variable spacing 2 | 5.010 | 5.028 |

Values corresponding to Conditional expressions 1 to 4 (and Conditional expression 1') in Example 2 are shown in Table 4, which will be described below. As can be seen from Table 4, Example 2 satisfies all of Conditional expressions 1 to 4 (and Conditional expression 1').

Example 3

FIG. 3 shows the structure of a projection lens according to Example 3. The projection lens according to Example 3 is similar to that according to Example 1 in that it includes a first lens group $G_1$ having a negative refractive power, a second lens group $G_2$ having a positive refractive power, and a third lens group $G_3$ having a positive refractive power arranged in this order from the magnification side and the reduction side thereof is substantially telecentric, but is different therefrom in the structure of the third lens group $G_3$.

That is, the third lens group $G_3$ includes six lenses, that is, a cemented lens of an eighth lens $L_8$, which is a biconvex lens, and a ninth lens $L_9$, which is a biconcave lens, a cemented lens of a tenth lens $L_{10}$, which is a biconvex lens, and an eleventh lens $L_{11}$, which is a negative meniscus lens having a convex surface facing the reduction side, and a cemented lens of a twelfth lens $L_{12}$, which is a biconvex lens, and a thirteenth lens $L_{13}$, which is a negative meniscus lens having a convex surface facing the reduction side, arranged in this order from the magnification side.

In addition, the projection lens according to Example 3 is substantially similar to that according to Example 1 in the lens structure of the first lens group $G_1$ and the second lens group $G_2$ and in that the fifth lens $L_5$ is moved in the optical axis direction to adjust focus.

In Table 3, an upper part shows the curvature radius R of each lens surface in the projection lens according to Example 3, the on-axis surface spacing D between the lenses, and the refractive index $N_d$ and the Abbe number $v_d$ of each lens with respect to the d-line. In Table 3, a lower part shows the variable spacing 1 (the gap between the fourth lens $L_4$ and the fifth lens $L_5$) and the variable spacing 2 (the gap between the fifth lens $L_5$ and the sixth lens $L_6$) when a magnification side power is 126.1 and 430.3.

TABLE 3

| Surface number | R | D | Nd | vd |
|---|---|---|---|---|
| 1 | 5.611 | 0.959 | 1.8348 | 42.7 |
| 2 | 13.598 | 0.015 | | |
| 3 | 4.181 | 0.299 | 1.8348 | 42.7 |
| 4 | 2.447 | 0.816 | | |
| 5 | 9.829 | 0.167 | 1.8348 | 42.7 |
| 6 | 2.721 | 0.932 | | |
| 7 | −4.704 | 0.266 | 1.8466 | 23.9 |
| 8 | 6.202 | Variable spacing 1 | | |
| 9 | −15.825 | 0.606 | 1.7725 | 49.6 |
| 10 | −4.015 | Variable spacing 2 | | |
| 11 | 6.223 | 0.179 | 1.7995 | 42.2 |
| 12 | 2.231 | 0.524 | 1.6727 | 32.1 |
| 13 | ∞ | 1.908 | | |
| 14 (Mask) | ∞ | 2.091 | | |
| 15 | 3.843 | 0.429 | 1.8010 | 35.0 |
| 16 | −3.092 | 0.129 | 1.6398 | 34.5 |
| 17 | 2.135 | 0.135 | | |
| 18 | 5.734 | 0.526 | 1.5163 | 64.1 |
| 19 | −1.619 | 0.228 | 1.8052 | 25.4 |
| 20 | −4.851 | 0.068 | | |
| 21 | 5.139 | 0.674 | 1.6180 | 63.3 |
| 22 | −2.515 | 0.228 | 1.8052 | 25.4 |
| 23 | −3.355 | 0.152 | | |
| 24 | ∞ | 3.185 | 1.5163 | 64.0 |
| 25 | ∞ | | | |

| | Magnification side power | |
|---|---|---|
| | 126.1 times | 430.3 times |
| Variable spacing 1 | 2.293 | 2.275 |
| Variable spacing 2 | 4.600 | 4.618 |

Values corresponding to Conditional expressions 1 to 4 (and Conditional expression 1') in Example 3 are shown in Table 4, which will be described below. As can be seen from Table 4, Example 3 satisfies all of Conditional expressions 1 to 4 (and Conditional expression 1').

Figure 5:
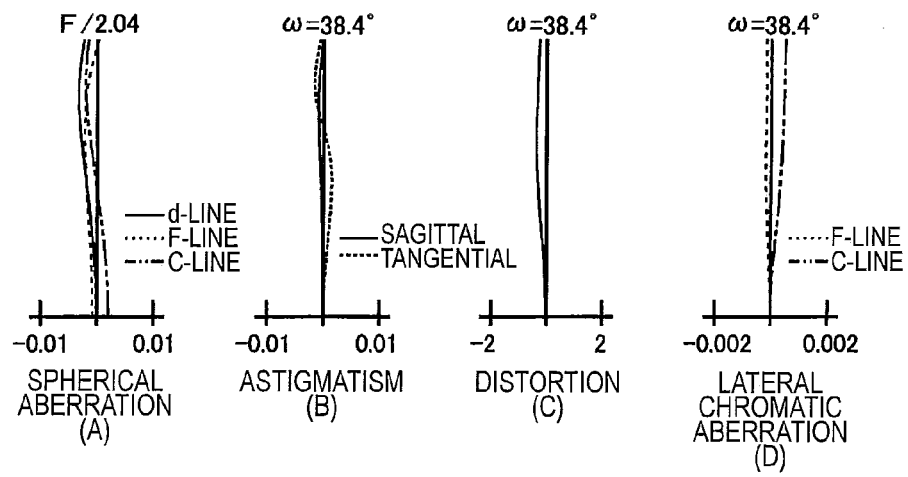
FIG. 5 is a diagram illustrating all aberrations of the projection lens according to Example 2, where (A) shows spherical aberration, (B) shows astigmatism, (C) shows distortion, and (D) shows lateral chromatic aberration.
Figure 6:
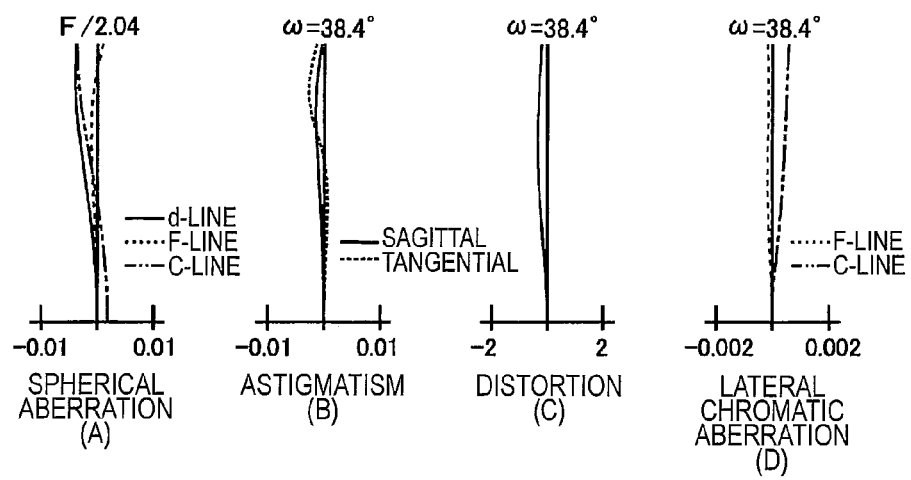
FIG. 6 is a diagram illustrating all aberrations of the projection lens according to Example 3, where (A) shows spherical aberration, (B) shows astigmatism, (C) shows distortion, and (D) shows lateral chromatic aberration.

FIGS. 4 to 6 are diagrams illustrating all aberrations (spherical aberration, astigmatism, distortion, and lateral chromatic aberration) of the projection lenses according to Examples 1 to 3. In the aberration diagrams, ω indicates a half angle of view. The spherical aberration diagram shows the aberration curves of the d-line, the F-line, and the C-line. The lateral chromatic aberration diagram shows the aberration curves of the F-line (represented by a dotted line, which is the same with the other lateral chromatic aberration diagrams) and the C-line (represented by a two-dot chain line, which is the same with the other lateral chromatic aberration diagrams) with respect to the d-line. As shown in FIGS. 4 to 6, in the projection lenses according to Examples 1 to 3, all aberrations including distortion and lateral chromatic aberration are effectively corrected, and the projection lenses have an F number of 2.04, which is a large value, and a total angle of view 2ω of 76.8 degrees, which is a wide angle.

The projection lens according to the invention is not limited to the above-described examples, but various modifications and changes of the invention can be made. For example, the curvature radius R of each lens and the on-axis surface spacing D between the lenses may be appropriately changed.

In addition, the projection display device according to the invention is not limited to the above-mentioned structure, but the projection lens according to the invention may be applied to various apparatuses. For example, a transmissive or reflective liquid crystal display device or a micro mirror device having a plurality of tiltable micro mirrors formed on a substantial plane (for example, a digital micro mirror device available from Texas Instruments, Inc.) may be used as the light valve. In addition, the structure of the illumination optical system may be appropriately changed depending on the kind of light valves.

TABLE 4

| | (1)$D_{G12}/f$ | (2)$f_1/f$ | (3)$f_{23}/f$ | (4)$n_{1G}$ |
|---|---|---|---|---|
| Example 1 | 4.00 | −6.78 | 3.92 | 1.83775 |
| Example 2 | 5.01 | −4.48 | 4.47 | 1.83775 |
| Example 3 | 4.60 | −5.75 | 4.00 | 1.83775 |

What is claimed is:

1. A projection lens consisting of:
   a first lens group having a negative refractive power;
   a second lens group having a positive refractive power; and
   a third lens group having a positive refractive power,
   wherein the first to third lens groups are arranged in this order from a magnification side,
   a lens unit arranged closest to a reduction side in the first lens group is moved along an optical axis to adjust focus, and
   the projection lens satisfies the following conditional expression:

$3.0<D_{G12}/f<6.0$ where $D_{G12}$ indicates a distance between the first lens group and the second lens group and f indicates the focal length of the entire lens system.

2. The projection lens according to claim 1,
   wherein the projection lens satisfies the following conditional expression:

$-8.0<f_1/f<-3.0$ where $f_1$ indicates the focal length of the first lens group.

3. The projection lens according to claim 1,
   wherein the projection lens satisfies the following conditional expression:

$2.5<f_{23}/f<6.0$ where $f_{23}$ indicates a composite focal length of the second lens group and the third lens group.

4. The projection lens according to claim 1,
   wherein the lens unit arranged closest to the reduction side in the first lens group is a single positive lens having a convex surface facing the reduction side.

5. The projection lens according to claim 4,
   wherein the projection lens satisfies the following conditional expression:

$1.8<n_{1G}$ where $n_{1G}$ indicates the average value of the refractive indexes of lenses in the first lens group with respect to the d-line, except for the lens unit arranged closest to the reduction side in the first lens group.

6. The projection lens according to claim 5,
   wherein a lens arranged closest to the reduction side in the third lens group is a cemented lens of a positive lens and a negative lens.

7. A projection display device comprising:
at least one light source;
at least one light valve;
at least one illumination optical unit that guides light emitted from the light source to the light valve; and
the projection lens according to claim 1,
wherein the light valve modulates the light emitted from the light source, and
the modulated light is projected onto a screen by the projection lens.

* * * * *